(12) United States Patent
Suk et al.

(10) Patent No.: US 8,693,785 B2
(45) Date of Patent: Apr. 8, 2014

(54) IMAGE MATCHING DEVICES AND IMAGE MATCHING METHODS THEREOF

(75) Inventors: Jung Hee Suk, Daejeon (KR); Sanghun Yoon, Daejeon (KR); Chun-Gi Lyuh, Daejeon (KR); Ik Jae Chun, Daejeon (KR); Tae Moon Roh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 198 days.

(21) Appl. No.: 13/211,912

(22) Filed: Aug. 17, 2011

(65) Prior Publication Data
US 2012/0148164 A1 Jun. 14, 2012

(30) Foreign Application Priority Data
Dec. 8, 2010 (KR) .................. 10-2010-0125016

(51) Int. Cl.
*G06K 9/46* (2006.01)
(52) U.S. Cl.
USPC ............................ 382/201; 382/209; 382/287
(58) Field of Classification Search
None
See application file for complete search history.

(56) References Cited

U.S. PATENT DOCUMENTS 6,694,064 B1 * 2/2004 Benkelman .................. 382/284
2009/0257680 A1 10/2009 Dhand et al.

FOREIGN PATENT DOCUMENTS

KR 1020060007816 A 1/2006
KR 1020100066914 A 6/2010

OTHER PUBLICATIONS

Torr et al., "Feature Based Methods and Motion Estimation", Vision Algorithms' 99, LNCS 1883, pp. 278-294, copyright 2000, Springer-Verlag Berlin Heidelberg 2000.*
Alexander Behrens, "Creating Panoramic Images for Bladder Fluorescence Endoscopy", Institute of Imaging and Computer Vision, RWTH Aachen University, Aacta Polytechnica Journal of Advanced Engineering, vol. 48, No. 3, copyright 2008, cover page and journal article pp. 50-54.*

* cited by examiner

*Primary Examiner* — Brian P Werner

(57) ABSTRACT

Provided is an image matching method of matching at least two images. The image matching method extracts feature points of a reference image and feature points of a target image, changes a feature point, selected from among the feature points of the reference image, to a reference point in the target image, sets a matching candidate region on the basis of the reference point, in the target image, and performs a similarity operation between the selected feature point in the reference image and a plurality of feature points included in the matching candidate region among the feature points of the target image. The image matching method decreases the number of similarity operations performed in the image matching operation, thereby guaranteeing a high-speed operation.

8 Claims, 6 Drawing Sheets

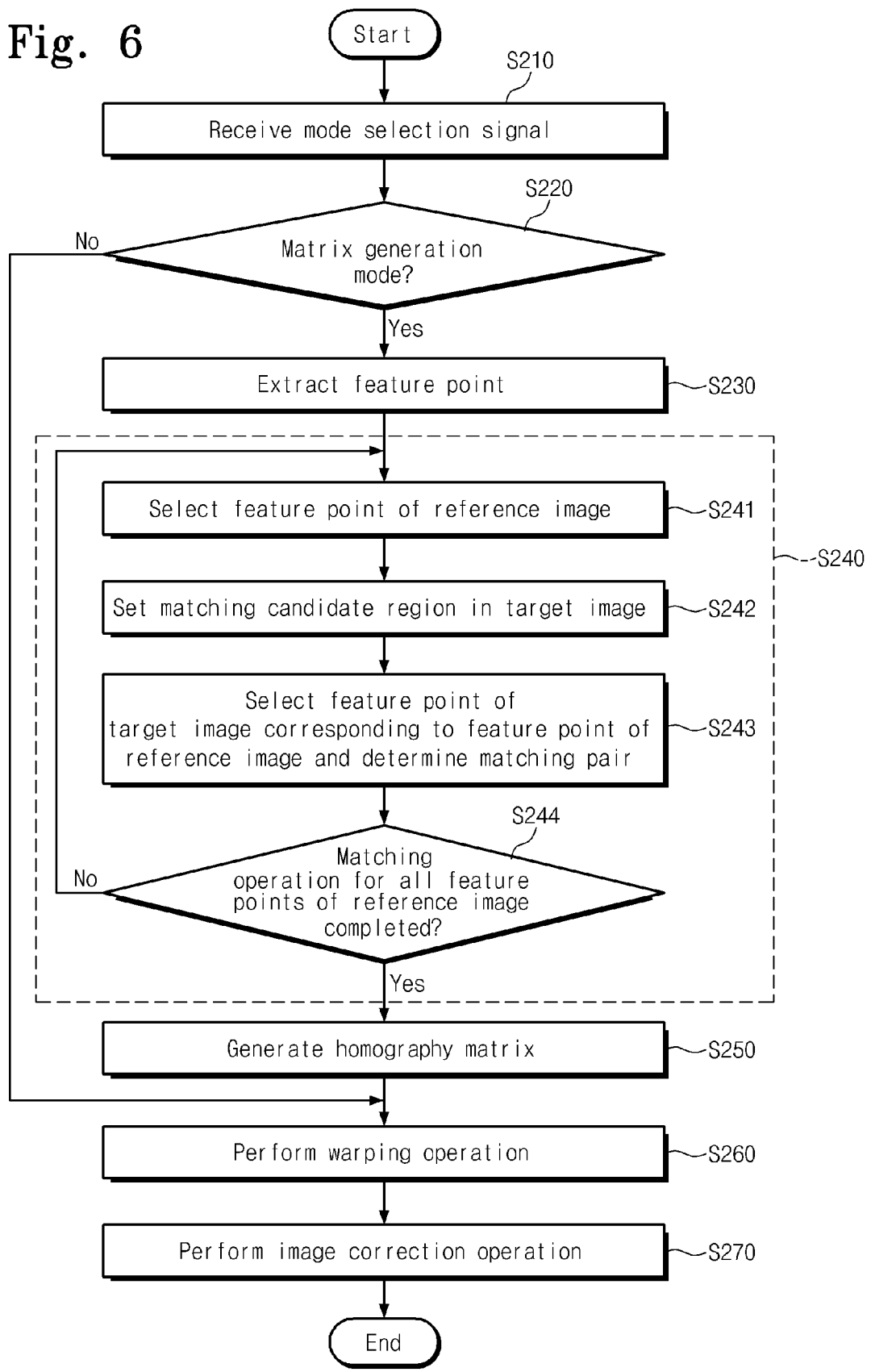

IMAGE MATCHING DEVICES AND IMAGE MATCHING METHODS THEREOF

CROSS-REFERENCE TO RELATED APPLICATIONS

This U.S. non-provisional patent application claims priority under 35 U.S.C. §119 of Korean Patent Application No. 10-2010-0125016, filed on Dec. 8, 2010, the entire contents of which are hereby incorporated by reference.

BACKGROUND OF THE INVENTION

The present invention disclosed herein relates to an image matching device, and more particularly, to an image matching device which matches at least two images.

Recently, research on image matching is actively being conducted for expanding the limited resolutions of cameras or aiding the monitoring of a broad region and the generation of a panorama image. Image matching denotes that a plurality of images are recomposed as one connected image. In image matching, feature points or depth information of images are used for matching two or more images.

Image matching devices require many complicated operations based on feature points and/or feature vectors. Particularly, when processing a plurality of camera moving images in real time, image matching devices are required to perform more operations. Due to this, a time taken in performing an image matching operation is increased.

SUMMARY OF THE INVENTION

The present invention provides an image matching device and method, which decrease the number of operations necessary for performing image matching, thereby guaranteeing a high-speed operation.

Embodiments of the present invention provide an image matching method of matching at least two images including: extracting feature points of a reference image and feature points of a target image; changing a feature point, selected from among the feature points of the reference image, to a reference point in the target image; setting a matching candidate region on the basis of the reference point, in the target image; and performing a similarity operation between the selected feature point in the reference image and a plurality of feature points included in the matching candidate region among the feature points of the target image.

In some embodiments, the image matching method may further include matching the selected feature point of the reference image and a feature point selected from among the feature points included in the matching candidate region, on the basis of the performed result of the similarity operation.

In other embodiments, the image matching method may further include generating a homography matrix based on the matched result of the feature points of the reference image and the feature points of the target image.

In still other embodiments, the image matching method may further include: performing a warping operation for the reference image and the target image by using the homography matrix; and performing an image correction operation for the reference image and the target image.

In even other embodiments, the selected feature point among the feature points of the reference image may be changed to the reference point by the homography matrix which has been generated in a previous image matching operation.

In yet other embodiments, the matching candidate region may be set centered around the reference point, and an area of the matching candidate region may be proportional to a degree of a change in a visual point of a camera which photographs the reference image or the target image.

In other embodiments of the present invention, an image matching device for matching at least two images includes: a memory storing a homography matrix; a matching candidate region setter setting a matching candidate region which corresponds to a feature point selected from among feature points of a reference image, in a target image; and a matching pair determiner measuring similarity between a plurality of feature points in the matching candidate region and the selected feature point of the reference image and determining a feature point of the target image matched with the selected feature point of the reference image.

In some embodiments, the image matching device may further include a homography matrix generator generating the homography matrix using a plurality of matching pairs determined by the matching pair determiner, wherein the homography matrix generated by the homography matrix generator is updated to the memory.

In other embodiments, the matching candidate region setter may change a coordinate of the selected feature point of the reference image to a coordinate of the target image by using the homography matrix stored in the memory.

In still other embodiments, an area of the matching candidate region may be proportional to a degree of a change in a visual point of a camera which photographs the reference image or the target image.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 6 is a flowchart illustrating an operation of the image matching device in FIG. 3, according to another embodiment of the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
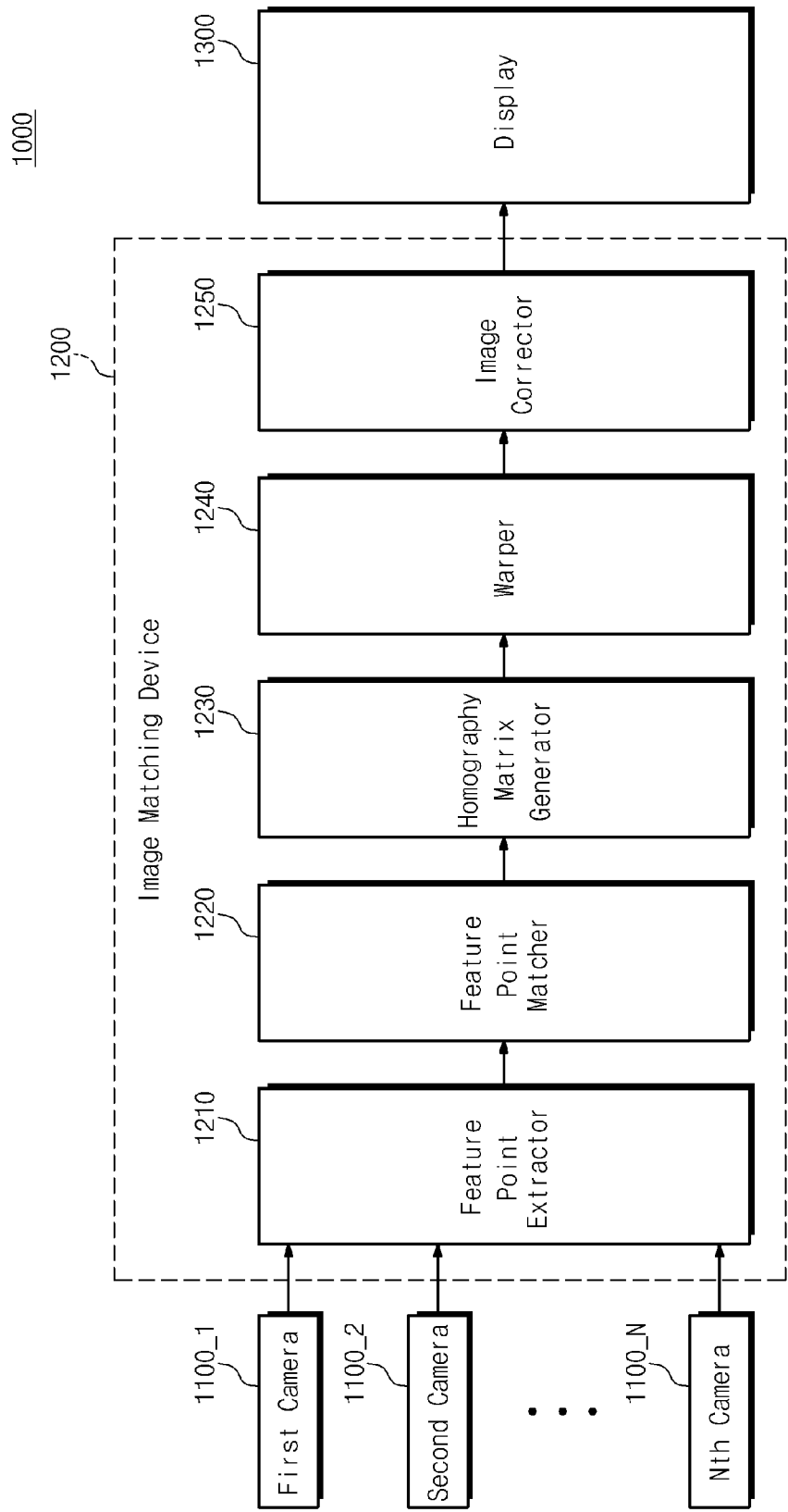
FIG. 1 is a block diagram illustrating an image matching system according to an embodiment of the present invention.

FIG. 1 is a block diagram illustrating an image matching system 1000 according to an embodiment of the present invention.

Referring to FIG. 1, the image matching system 1000 includes a plurality of cameras 1100_1 to 1100_N, an image matching device 1200, and a display 1300.

Each of the cameras 1100_1 to 1100_N photographs an image of a subject. The cameras 1100_1 to 1100_N, for example, may be installed in a specific location (for example, an intersection) in order to generate a panorama image for monitoring a broad region.

Moreover, the cameras 1100_1 to 1100_N may be installed in a mobile device such as a vehicle, a ship, or an airplane. In this case, to generate the panorama image, the respective cameras 1100_1 to 1100_N may be attached to a mobile device in a fixed type so as to have different visual points.

The image matching device 1200 receives images from the respective cameras 1100_1 to 1100_N. The cameras 1100_1 to 1100_N respectively register the received images to generate a panorama image. The image matching device 1200 includes a feature point extractor 1210, a feature point matcher 1220, a homography matrix generator 1230, a warper 1240, and an image corrector 1250.

The feature point extractor 1210 receives images from the respective cameras 1100_1 to 1100_N. The feature point extractor 1210 extracts feature points of a reference image and target image from among the received images. Herein, the reference image and the target image are two images to be applied to an image matching operation. The feature point extractor 1210, for example, may extract feature points with algorithms such as Scale Invariant Feature Transform (SIFT), Speeded Up Robust Features (SURF), and Maximum Stable Estremal Regions (MSER).

The feature point matcher 1220 receives information regarding feature points from the feature point extractor 1210. The feature point matcher 1220 selects a feature point most similar to the feature point of the reference image from among the feature points of the target image, and determines the selected feature point of the reference image and the selected feature point of the target image as a matching pair.

Herein, an operation, which selects a feature point of the target image most similar to any one feature point of the reference image and determines the selected feature points as a matching pair, may be called a matching operation. The feature point matcher 1220 repeatedly performs the matching operation for the feature points of the reference image.

The homography matrix generator 1230 receives information (for example, coordinate information of the matching pairs) regarding the matching pairs from the feature point matcher 1220. The homography matrix generator 1230 generates a homography matrix on the basis of the information regarding the matching pairs.

The warper 1240 performs a warping operation for the reference image and the target image by using the homography matrix generated by the homography matrix generator 1230. The image corrector 1250 performs a correction operation for the reference image and the target image with a blending algorithm, a graphcut algorithm, etc.

The image matching operation for the reference image and the target image is performed, and thereafter, the image matching device 1200 repeatedly performs an image matching operation for other images received from the respective cameras 1100_1 to 1100_N. Accordingly, a panorama image may be generated. The display 1300 provides the panorama image to a viewer.

In FIG. 1, it is described that the feature point extractor 1210 extracts feature points for two images to be applied to the image matching operation prior to other images, but this should be understood as an example. As another example, the feature point extractor 1210 may perform a feature point extracting operation for the images received from the respective cameras 1100_1 to 1100_N, at one time.

Figure 2:
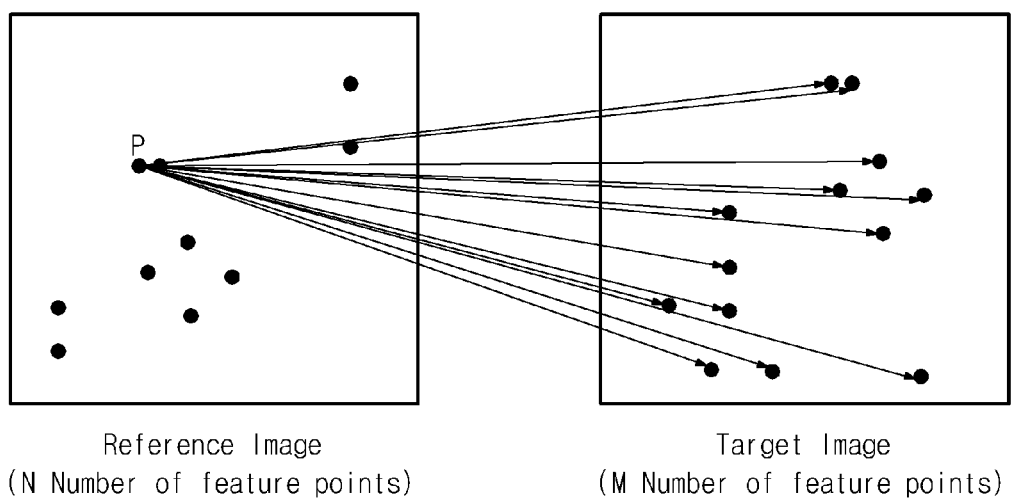
FIG. 2 is a diagram for describing an operation of a feature point matcher in the image matching device of FIG. 1.

FIG. 2 is a diagram for describing an operation of the feature point matcher 1220 in the image matching device 1200 of FIG. 1. For convenience, it is assumed that the reference image has N number of feature points (where N is a natural number equal to or more than one), and the target image has M number of feature points (where M is a natural number equal to or more than one). Also, it is assumed that the reference image is an image photographed by the first camera 1100_1 (see FIG. 1), and the target image is an image photographed by the second camera 1100_2 (see FIG. 1).

Referring to FIG. 2, the reference image photographed by the first camera 1100_1 and the target image photographed by the second camera 1100_2 have different feature points, respectively. When performing a matching operation for a feature point P among the feature points of the reference image, the feature point matcher 1220 measures similarity between the feature point P and the M feature points of the target image, and matches the feature point P with a feature point of the target image most similar to the feature point P. Such matching operation is performed for each of the N feature points of the reference image.

Figure 3:
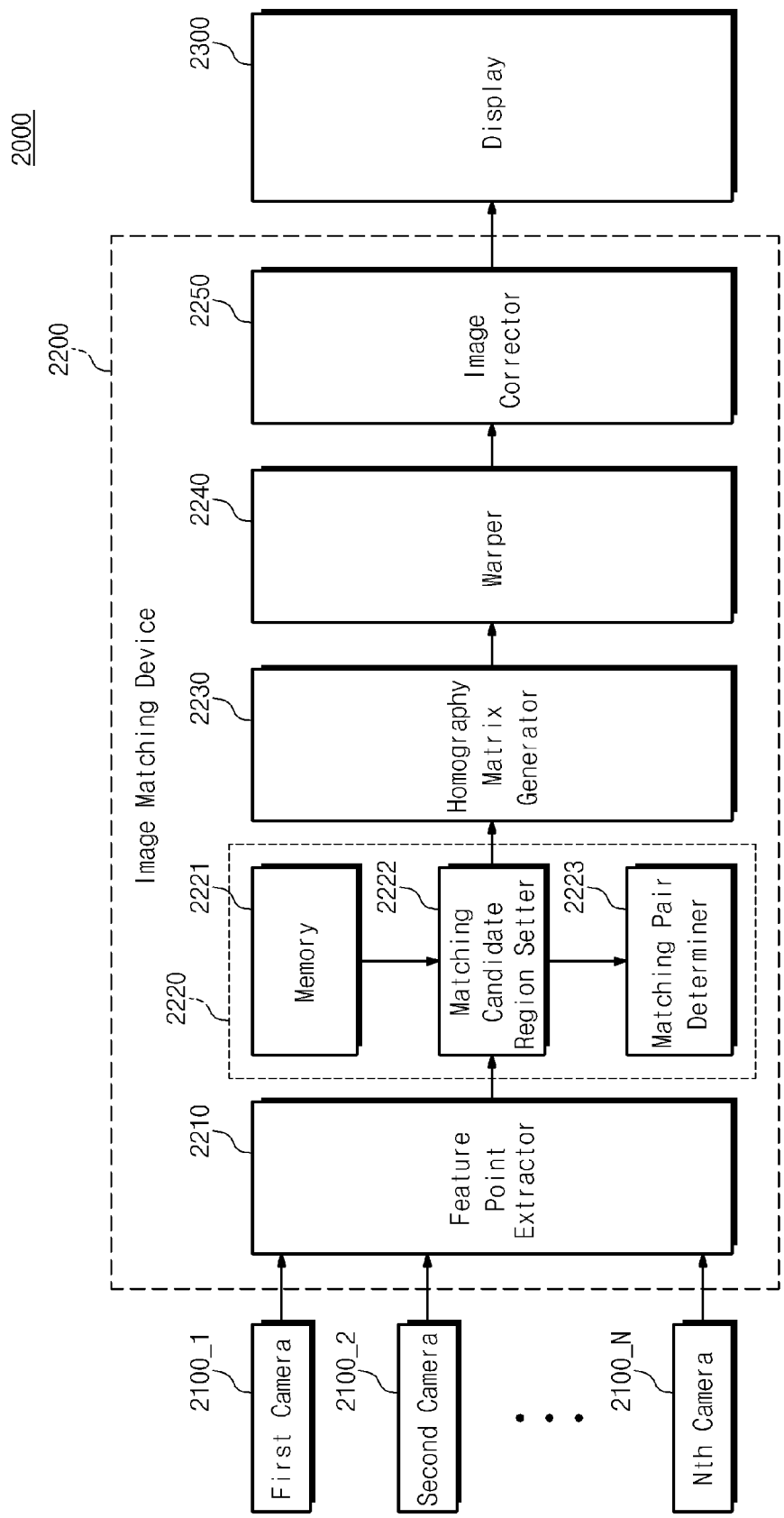
FIG. 3 is a block diagram illustrating an image matching system according to another embodiment of the present invention.

Therefore, to respectively match all the feature points of the reference image with the feature points of the target image, the feature point matcher 1220 is required to perform a similarity operation of maximum N*M times. The number of such similarity operations is one of largest causes that decrease the operation speed of the image matching device 1200. Furthermore, when performing an image matching operation for at least three or more images, the number of similarity operations performed by the feature point matcher 1220 is further increased. In FIG. 3, the following description will be made on an image matching device according to another embodiment of the present invention that decreases the number of similarity operations performed by the feature point matcher 1220.

FIG. 3 is a block diagram illustrating an image matching system 2000 according to another embodiment of the present invention. The image matching system 2000 of FIG. 3 is similar to the image matching system 1000 of FIG. 1. Therefore, the following description will be focused on a difference between the image matching systems 1000 of FIG. 1 and the image matching system 3000 of FIG. 3.

Referring to FIG. 3, the image matching system 2000 includes a plurality of cameras 2100_1 to 2100_N, an image matching device 2200, and a display 2300. The image matching device 2200 includes a memory 2221, a matching candidate region setter 2222, and a matching pair determiner 2223.

The feature point matcher 2220 sets a matching candidate region by using a homography matrix (or a homography matrix in manufacturing a product) that has been generated in a previous stage, and thus decreases the number of similarity operations compared to the feature point matcher 1220 of FIG. 1. Unlike the feature point matcher 1220 of FIG. 1, the feature point matcher 2220 of FIG. 3 includes the memory 2221, the matching candidate region setter 2222, and the matching pair determiner 2223.

The memory 2221 receives the homography matrix from the homography matrix generator 2230 and stores the homography matrix. For example, in an initial manufacturing stage of the image matching device 2200, the memory 2221 may store a predetermined homography matrix. As another example, when an image matching operation is performed in a previous stage, the memory 2221 may store a homography matrix that has been generated in a previous stage.

The matching candidate region setter 2222 receives information regarding feature points from the feature point extractor 2210. For example, the matching candidate region setter 2222 receives information regarding feature points of a reference image and target image to be applied to an image matching operation from the feature point extractor 2210.

The matching candidate region setter 2222 selects any one feature point from among the feature points of the reference image. The matching candidate region setter 2222 calculates a coordinate of the target image corresponding to the selected feature point of the reference image by using the homography matrix stored in the memory 2221. The matching candidate region setter 2222 sets a matching candidate region in the target image on the basis of the calculated coordinate.

The matching pair determiner 2223 receives information regarding the matching candidate region from the matching candidate region setter 2222. The matching pair determiner 2223 performs a similarity operation between feature points included in respective matching candidate regions and the selected feature point of the reference image. The matching pair determiner 2223 selects a feature point most similar to the selected feature point of the reference image from among the feature points in the matching candidate region, and determines the selected feature point of the target image and the selected feature point of the reference image as a matching pair.

An matching operation for the selected feature point of the reference image is performed, and thereafter, the feature point matcher 2220 repeatedly performs a matching operation for other feature points of the reference image.

A matching operation is completed, and then, the homography matrix generator 2230 generates a homography matrix with matching pairs. The warper 2240 performs a warping operation with the homography matrix generated by the homography matrix generator 2230, and the image corrector 2250 performs a correction operation with the homography matrix generated by the homography matrix generator 2230. the homography matrix generated by the homography matrix generator 2230 is updated to the memory.

Figure 4:
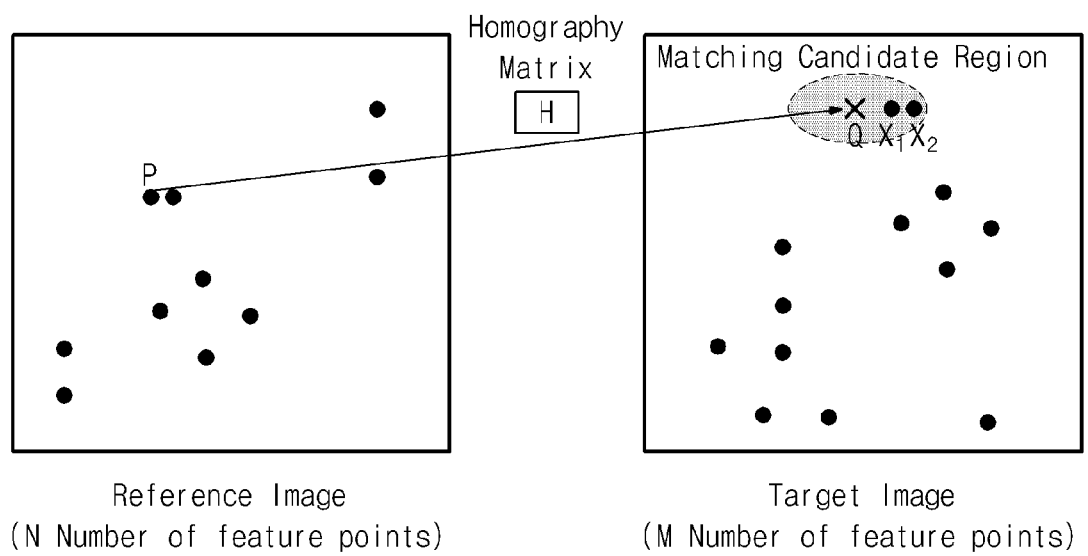
FIG. 4 is a diagram for describing an operation of a feature point matcher in the image matching device of FIG. 3.

FIG. 4 is a diagram for describing an operation of the feature point matcher 2220 in the image matching device 2200 of FIG. 3. As in FIG. 1, it is assumed that the reference image is an image photographed by the first camera 2100_1 (see FIG. 3) and has N number of feature points (where N is a natural number equal to or more than one). Also, it is assumed that, and the target image is an image photographed by the second camera 2100_2 (see FIG. 3) and has M number of feature points (where M is a natural number equal to or more than one). Hereinafter, an operation of the feature point matcher of FIG. 3 will be described in more detail with reference to FIGS. 3 and 4.

When the first and second cameras 2100_1 and 2100_2 are attached to a mobile device such as a vehicle, a ship, or an airplane in a fixed type, the visual points of the first and second cameras 2100_1 and 2100_2 are constant or have a small change. Therefore, there is much possibility that a current matching pair may exist near a matching pair of a previous stage. Information regarding the matching pair of the previous stage may be obtained using a homography matrix that has been generated in the previous stage. The feature point matcher 2220 sets a matching candidate region by using the homography matrix that has been generated in the previous stage, and thus can decrease the number of similarity operations performed.

To provide a detailed description, when selecting a feature point of the target image that is matched with a feature point P among the feature points of the reference image, the matching candidate region setter 2222 changes a coordinate of the feature point P to a coordinate (hereinafter referred to as a coordinate Q) in the target image by using a homography matrix H of the previous stage stored in the memory 2221. In this case, a point corresponding to the coordinate Q may be called a reference point.

Since the first and second cameras 2100_1 and 2100_2 have a small change in a visual point, there is a high probability that a feature point of the target image to be matched with the feature point P may exist near the coordinate Q (i.e., a reference point). Therefore, the matching candidate region setter 2222 sets a matching candidate region with respect to the reference point. In this case, the matching candidate region may be set as a circle centered around the reference point. A radius of the matching candidate region may be determined according to the degree of a change in the visual point of each of the first and second cameras 2100_1 and 2100_2. For example, the radius of the matching candidate region may be proportional to the degree of the changed visual point of each of the first and second cameras 2100_1 and 2100_2. Also, the matching candidate region may be set in a tetragonal shape centered around the reference point.

The matching candidate region is set, and thereafter, the matching pair determiner 2223 performs a similarity operation on feature points included in the matching candidate region and the feature point P of the reference image. For convenience, it is assumed that two feature points (X1, X2) exist in the matching candidate region of FIG. 4. The matching pair determiner 2223 performs a similarity operation between the feature point P of the reference image and the feature points (X1, X2) of the target image, and then matches the feature point P of the reference image with a feature point of feature points (X1, X2) of the target image most similar to the feature point P of the reference image. Subsequently, a matching operation for other feature points of the reference image is repeatedly performed.

In this case, the number of similarity operations performed by the matching pair determiner 2223 is reduced compared to the number of similarity operations performed by the feature point matcher 1200 of FIG. 1. Accordingly, the image matching device 2200 of FIG. 3 may perform an image matching operation at a high speed compared to the image matching device 1200 of FIG. 1.

Figure 5:
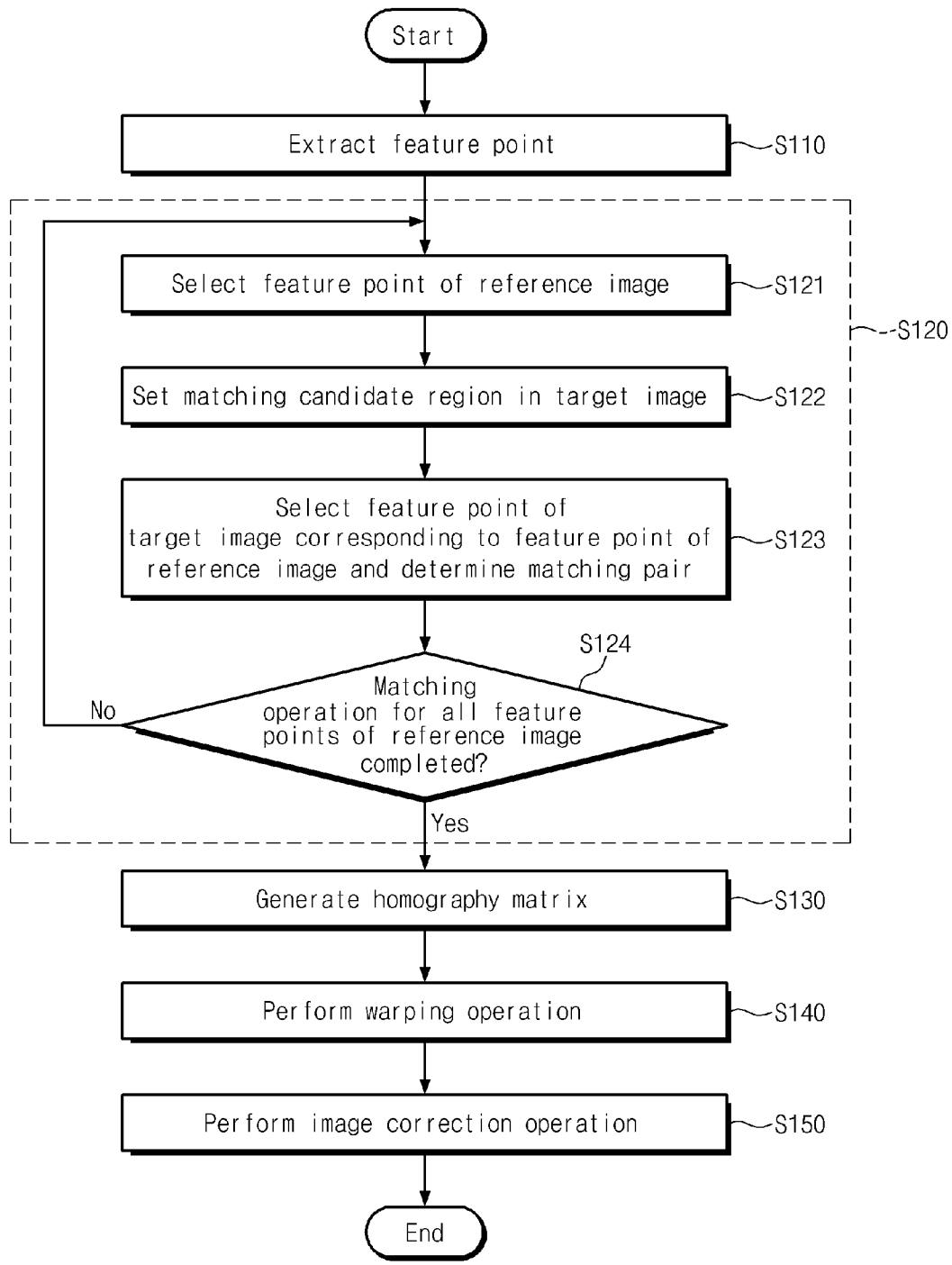
FIG. 5 is a flowchart illustrating an operation of the image matching device in FIG. 3.

FIG. 5 is a flowchart illustrating an operation of the image matching device 2200 of FIG. 3.

In operation S110, the feature point extractor 2210 extracts feature points of images photographed by the cameras 2100_1 to 2100_N. For example, the feature point extractor 2210 may first extract feature points of a reference image and target image to be applied to an image matching operation. As another example, the feature point extractor 2210 may extract feature points of a plurality of images at one time.

In operation S120, the feature point matcher 2220 performs a matching operation between the reference image and the target image.

Specifically, the matching candidate region setter 2222 selects a certain feature point from among the feature points of the reference image in operation S121.

In operation S122, the matching candidate region setter 2222 changes a feature point of the reference image to a coordinate of the target image by using a homography matrix H stored in the memory 2221, and sets a matching candidate region.

In operation S123, the matching pair determiner 2223 performs a similarity operation between feature points in the matching candidate region and a feature point of the reference image, and matches the feature point of the reference image with a feature point, which is most similar to the feature point of the reference image, among the feature points in the matching candidate region.

In operation S124, whether a matching operation for all the feature points of the reference image is completed is determined When the matching operation for all the feature points of the reference image is not completed, the matching candidate region setter 2222 repeatedly performs a matching operation for a new feature point among the feature points of the reference image. When the matching operation for all the feature points of the reference image is completed, operation S130 is performed.

In operation S130, the homography matrix generator 2230 generates a new homography matrix H by using a plurality of matching pairs determined by the feature point matcher 2220. Subsequently, the warper 2240 performs a warping operation for the reference image and the target image by using the new homography matrix H in operation S140, and the image corrector 2250 performs an image correction operation in a technique such as blending or graphcut. the homography matrix H generated by the homography matrix generator 2230 is updated to the memory 2221.

The above description should be understood as an example, and the inventive concept is not limited thereto. For example, in FIGS. 1 to 5, it is assumed that the homography matrix is generated each time the image matching operation is performed. This should be understood as an example.

For example, the homography matrix may be performed at a certain time interval (at a certain period), or performed in response to an external command. Hereinafter, a method according to an embodiment of the present invention that generates a homography matrix in response to an external command will be described in more detail with reference to FIG. 6.

FIG. 6 is a flowchart illustrating an operation of the image matching device 2200 in FIG. 3, according to another embodiment of the present invention.

In operation S210, the image matching device 2200 receives a mode selection signal. For example, the image matching device 2200 may receive the mode selection signal from a user, or receive the mode selection signal from a central processing unit (CPU, not shown) for controlling the image matching device 2200.

In operation S220, the image matching device 2200 determines whether the mode selection signal is a matrix generation mode.

When the mode selection signal is the matrix generation mode, the image matching device 2200 performs an operation that generates a new homography matrix by using a homography matrix generated in a previous stage in operations S230 and S241 to S244. This is similar to operations S110 and S121 to S124 of FIG. 5, and thus, a detailed description will not be provided. Subsequently, the image matching device 2200 performs a warping operation and an image correction operation by using the newly generated homography matrix in operations S260 and S270.

When the mode selection signal is not the matrix generation mode, the image matching device 2200 does not generate a new homography matrix, but performs the warping operation and the image correction operation by using the homography matrix stored in the memory 2221 in operations S260 and S270.

As described above with reference to FIG. 6, the image matching device 2200 may selectively generate a homography matrix in response to the mode selection signal. For example, when the cameras 2100_1 to 2100_N have no change in a visual point, a new homography matrix is not required to be generated. In this case, the image matching device 2200 does not perform an operation of generating a homography matrix, and thus can perform the image matching operation at a higher speed.

As described above, the image matching device 2200 according to another embodiment of the present invention sets a matching candidate region by using a homography matrix that has been generated in a previous stage, and thus can enhance the speed of the image matching operation. The above description should be understood as an example, and the inventive concept is not limited thereto. For example, the image matching device 2200 in FIGS. 1 and 3 may extract a feature vector, and perform the image matching operation by using the extracted feature vector.

The image matching device according to embodiments of the present invention sets a matching candidate region by using a homography matrix that has been generated in a previous stage, and thus decreases the number of similarity operations, thereby enabling a high-speed operation.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An image matching method of matching at least two images, the image matching method comprising:
   extracting, by an image matching device, feature points of a reference image and feature points of a target image;
   selecting a feature point from the features points of the reference image;
   mapping the selected feature point to a reference point in the target image by using a predetermined homography matrix and then performing a similarity operation;
   defining a matching candidate region on the target image based on the reference point, the matching candidate region being a region that is substantially smaller than a region defined by the target image and sufficiently large to include the reference point and at least two feature points of the target image; and
   performing a similarity operation between the selected feature point -of the reference image and the feature points of the target image provided within the matching candidate region,
   wherein the matching candidate region is set centered around the reference point, and
   wherein an area of the matching candidate region is proportional to a degree of a change in a visual point of a camera which photographs the reference image or the target image.

2. The image matching method of claim 1, further comprising matching the selected feature point of the reference image and a feature point selected from the feature points provided within the matching candidate region, on the basis of a result of the similarity operation.

3. The image matching method of claim 2, further comprising generating a homography matrix based on a result of matching the selected feature point of the reference image and a feature point selected from the feature points provided within the matching candidate region.

4. The image matching method of claim 3, further comprising:
performing a warping operation for the reference image and the target image by using the homography matrix; and
performing an image correction operation for the reference image and the target image.

5. An image matching device for matching at least two images, the image matching device comprising:
a memory configured to store a predefined homography matrix;
a matching candidate region setter configured to map a feature point of a reference image to a reference point in a target image by using the predefined homography matrix, and define a matching candidate region -on the target image based on the reference point, the matching candidate region being a region that is substantially smaller than a region defined by the target image and sufficiently large to include the reference point and a plurality feature points of the target image; and
a matching pair determiner configured to measure similarity between the feature point of the reference image and the feature points of the target image provided within the matching candidate region,
wherein the matching candidate region is set centered around the reference point, and wherein an area of the matching candidate region is proportional to a degree of a change in a visual point of a camera which photographs the reference image or the target image.

6. The image matching device of claim 5, further comprising a homography matrix generator configured to generate a homography matrix using a matching pair obtained by the matching pair determiner,
wherein the homography matrix generated by the homography matrix generator is stored in the memory and replaces the predefined homography matrix.

7. The image matching device of claim 5, the predetermined homography matrix is stored in the memory during a manufacture of the image matching device.

8. An image matching device for matching a reference image and a target image, the image matching device comprising:
a memory configured to store a predefined homography matrix; and
hardware configured to perform a method including:
extracting feature points of the reference image and feature points of the target image;
selecting a feature point from the features points of the reference image;
mapping the selected feature point to a reference point in the target image by using a predetermined homography matrix and then performing a similarity operation;
defining a matching candidate region on the target image based on the reference point, the matching candidate region being a region that is substantially smaller than a region defined by the target image and sufficiently large to include the reference point and at least two feature points of the target image; and
performing a similarity operation between the selected feature point of the reference image and the feature points of the target image provided within the matching candidate region,
wherein the matching candidate region is set centered around the reference point, and wherein an area of the matching candidate region is proportional to a degree of a change in a visual point of a camera which photographs the reference image or the target image.

* * * * *